US00RE48829E

(19) United States
(12) Reissued Patent
Amos

(10) Patent Number: US RE48,829 E
(45) Date of Reissued Patent: Nov. 23, 2021

(54) ADVANCED METHODS OF AND APPARATUS FOR THE MANIPULATION OF ELECTROMAGNETIC PHENOMENON: THE DECODING OF GENETIC MATERIAL AND THE HUMAN GENOME (E3)

(71) Applicant: Carl Raymond Amos, Tampa, FL (US)

(72) Inventor: Carl Raymond Amos, Tampa, FL (US)

(21) Appl. No.: 15/732,032

(22) Filed: Sep. 7, 2017

Related U.S. Patent Documents

Reissue of:
(64) Patent No.: 9,128,461
Issued: Sep. 8, 2015
Appl. No.: 11/551,246
Filed: Oct. 20, 2006

(51) Int. Cl.
*G03H 1/04* (2006.01)
*G03H 1/02* (2006.01)
*G03H 1/00* (2006.01)

(52) U.S. Cl.
CPC ..... *G03H 1/04* (2013.01); *G03H 1/02* (2013.01); *G03H 1/0404* (2013.01); *G03H 2001/0216* (2013.01); *G03H 2001/0413* (2013.01); *G03H 2001/0439* (2013.01); *G03H 2223/18* (2013.01)

(58) Field of Classification Search
CPC ..... G03H 1/0404; G03H 1/02; G03H 1/04; G03H 2001/0439; G03H 2223/18; G03H 2001/0216; G03H 2001/0413; G03H 2223/24
See application file for complete search history.

(56) References Cited

U.S. PATENT DOCUMENTS 3,843,260 A * 10/1974 Edmonds ..... G01B 9/021 356/458
3,970,357 A * 7/1976 Moraw ..... G03H 1/26 359/22
4,874,213 A * 10/1989 Cowan ..... G02B 5/1857 359/10
5,369,511 A * 11/1994 Amos ..... 359/15
5,655,832 A * 8/1997 Pelka et al. ..... 362/296.09
5,923,465 A * 7/1999 Byrd ..... 359/368
7,210,806 B2 * 5/2007 Holman et al. ..... 362/19

* cited by examiner

*Primary Examiner* — Christina Y. Leung

(57) ABSTRACT

An advanced method of and apparatus for manipulating electromagnetic spectra, which incorporates a bent tepee or bent pyramidal aligned array of conical or pyramidal inverted sections that have at least two intrinsic angles of differing values aligned co-axially. These are arranged to naturally produce a reference and object waves that impinges on and illuminate a holographic plate or recording means to produce on-axis or in-line transmission and reflection holograms, including real time display. The technology is also applicable to the detection, identification, and/or decoding of genetic material, specifically DNA and the Human Genome.

10 Claims, 21 Drawing Sheets

Bent Conical/Teepee Lens
(Stepwise View)

Bent Pyramidal Lens

Bent Pyramidal Lens
(Solid View)

Bent Pyramidal Lens
(Partial Stepwise View)

Bent Pyramidal Lens
(Truncated)

Bent Conical/Teepee Lens

Bent Conical/Teepee Lens
(Solid View)

Bent Conical/Teepee Lens
(Stepwise View)

Bent Conical / Teepee Lens
(Stepwise Truncated View)

On-Axis Transmission Hologram of Object

On-Axis Transmission Hologram of Traffic Arrow

Sample Holographic
*Traffic Signal Image*

Digital Holographic
3D Traffic Light
On-Axis
3D Image of Arrow
20
Holographic
Screen
23
Computer
Image
Projector
33
Signal Head
Housing
31
Light Source
32
Traffic
Signal Head
30
Traffic
Image Signal
35
Minicomputer /
Traffic Controller
34
Holographic
Images
21

Digital Holographic
Real-Time Image

Advanced Holographic 3D Traffic Light On-Axis

Bent Angle
Nested X-ray Lens

Pyramidal/Conical
Nested X-ray Lens $$\nabla^2 u_a = u_{xx} + u_{yy} + u_{zz}$$
$$\nabla^2 u_a = \nabla^2 u_b$$
$$\lim f\alpha \rightarrow 90°$$
$$\nabla^2_b u = u_{xx} + u_{yy} + u_{zz}$$
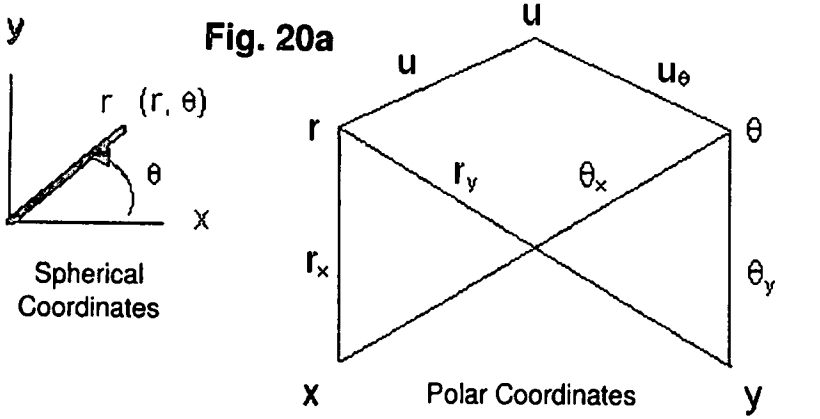
Fig. 20
Fig. 20a
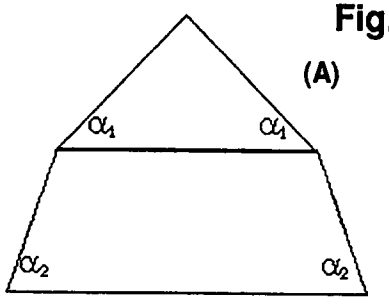
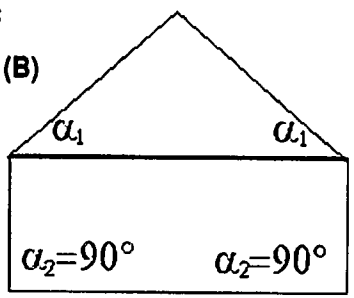
Fig. 20c
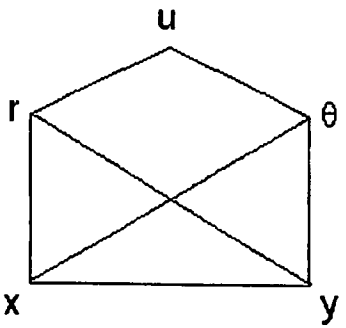
Fig. 20b HOE Pattern Recognition Filter
Ms = scanning mirrors Object beam(s)
M1-j = reference beam mirrors
X1-n = separation distance and position of arrays
GATCA n x n array 1-i
EM Radiation
DNA
Lens
CCD
Real Time Computing Means
G A T C A nxn Array

ADVANCED METHODS OF AND APPARATUS FOR THE MANIPULATION OF ELECTROMAGNETIC PHENOMENON: THE DECODING OF GENETIC MATERIAL AND THE HUMAN GENOME (E3)

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The instant invention is directed to further advanced methods of and apparatus for manipulating electromagnetic phenomenon. To further convey information, utilizing substantial portions of visible and invisible spectra and to further manipulate information, whether that information is in the form of pictorial displays, such as holographic displays; in the form of numerical information, such as digital or analog numerical information; or in the form of communication signals, wherein the signals are selected from any portion of the electromagnetic spectrum.

2. Prior Art

One of a number of fields to which the instant invention applies is the field of holography. In order to create a holographic image, it is necessary to superimpose two coherent light beams, which are incident on the same photographic plate/means or other suitable recording device. One beam is known as the "object beam" and the other beam as the "reference beam". In off-axis holography, the beams are separated by an angle θ, which is typically 45°. The term "off-axis" is used because the angle, θ, between the beams results in the axis of the beams not being coaxial. The general equation of holography has some complexity and does not lend itself to any solution other than a numerical solution, see Method of and Apparatus for the Manipulation of Electromagnetic Phenomenon, U.S. Pat. No. 5,369,511 incorporated by reference herein. In accordance with the practices of the prior art, a reference wave or pure "plain wave", is mixed with modulated object information (object wave). It can be readily seen that if the angles between the waves $R_\theta$ and $O_\theta$ approximately equal zero, then the beams or waves are essentially coaxial. The result is "in-line" holography. However, the problem which presents itself is that these prior art approaches have not produced viable holograms because prior art in-line systems are prone to double images, zero-order aberrations, or both. While holography is generally considered to be a phenomenon primarily of interest with respect to the entire electromagnetic spectrum for the display of images utilizing complex light beams or manipulation of optical information utilizing laser beams, many of the same principles, which are applicable to visible light are also applicable to other portions of the electromagnetic spectrum such as infrared and ultraviolet radiation, radio waves and X-rays. There still is a need for new devices, which further extends the optical principles utilized in holography to effectively create practical, working, robust Transmission and Reflection on-axis, in-line, holograms.

SUMMARY OF THE INVENTION

The Advanced Holographic Lens is the object of the instant invention to further provide more advanced methods and apparatus for manipulating electromagnetic phenomenon and to further enhance and improve the applications of such phenomenon. Incorporated, herein by reference U.S. Pat. No. 5,369,511 provides a detailed summary of the prior art. The improvements of the instant invention overcome the limitations inherent in U.S. Pat. No. 5,369,511, which primarily are the inability to create or produce a true practical transmission hologram of a two-dimensional or three-dimensional object.

True practical transmission Holographic Optical Elements (HOEs) and Diffractive Optical Elements (DOES) or moving optical elements (MOEs) are easily demonstrated and proved in U.S. Pat. No. 5,369,511 as is reflection holograms (HOEs and objects) since the separation is 180°. However, to make a true transmission hologram of an object(s) requires a new optical apparatus of considerable complexity, sophistication, and advancement.

The theory of a bent pyramid as postulated by archeologists, architects, Egyptologists (including armchair Egyptologists) is that this structure, created by an ancient Egyptian pharaoh called Sneferu, was a failure. This author and inventor has concluded that this analysis is horribly flawed and prior conclusions and observations by well established scientists and academes over the millennia are in substantial error. The structure itself naturally contains two angles, which are amazingly aligned and magically coaxial. The author and inventor, through strain, patience, and persistence, has created a new hybrid optical apparatus. Laplace Transform concepts can be considered in this new embodiment. The improved apparatus allows the practical creation of on-axis, i.e., in-line transmission holograms of physical objects and digital computer images, computer generated holograms, and printed media that can be readily viewed over an entire hemisphere (180-360°) or generally from any angle or position without the vexing problems inherent in prior art systems.

Essentially a bent pyramid or bent teepee/cone is employed, the bent pyramid or bent teepee/cone must be highly reflective and or have a first surface mirror surface on both its interior and exterior, (blackening of exterior is optional) any appropriate material can be used, and any practical means may be employed to make/manufacture and fabricate the apparatus, using metal, glass plastics polymers composites etc. virtually any materials and means known to those skilled in the art can be used (including diffractive optics and holographic optical elements etc.). The top most section is level 1 and the bottom section or lower level is level 2. One must select the desired angle (θ) of the topmost and bottom pyramid/cone portions (dihedral slanted mirrors), i.e. $\theta_1$ & $\theta_2$. Also select the interior or compound angles for Level 1 and Level 2, e.g. $\alpha_1$ & $\alpha_2$ respectively. A desired length and period for the dihedral slanted mirrors can be chosen.

However, in this new embodiment, again the Laplace Transform is more appropriate and can be used if desired. According to the specified angle, period, and spacings of the mirrors, the bent tepee/conical or bent pyramid is then separated into sections by means known to those skilled in the art and the sections are then rearranged or turned around and inverted and the series of mirrored angular sections (dihedral slanted mirrors) are stacked and assembled into a bent pyramidal/bent teepee conical structure apparatus with multiple angular inverted (a series of stacked slanted i.e. dihedral mirrors) highly reflective sides or steps. The series of first surface, slanted or dihedral mirrors may be fabricated, stacked and assembled by methods and means known to those skilled in the art and alternately they may be stacked on a bent pyramid/bent conical teepee base, which may be clear or have its own optical properties. The level 1 top most section of the bent pyramid bent teepee/cone can be truncated when creating many of the object transmission holograms, this will facilitate the process. However, truncation is optional.

An object to be holographed as a transmission type hologram can be made to fit inside or in the interior of the apparatus (if desired) in the topmost portion Level 1 of the bent pyramid/bent teepee/cone apparatus. The topmost angles $\theta_1$, (series of dihedral slanted mirrors) of level 1 can serve to create the scanning beam or means, which becomes the object wave. Each contiguous step (mirror) angle of this portion of the apparatus can be selected, for example choose 40° or choose 44°. The array of stacked mirrors per each level should possess the same constant angle. An incoming on-axis coaxial, coherent spread beam from a laser or other coherent light source will reflect essentially backwards onto the physical object to be holographed at $2\theta$ or approximately 80° or 88° (depending on which angle is chosen, obviously 45° will reflect back at 90°).

Therefore the level 1 topmost array of slanted mirrors will scan internally onto the physical object at approximately 360° around and over 180° for a bent teepee/cone or bent pyramid apparatus according to the laws of incidence and reflection, generally incidence angle=reflection angle. Therefore, the scanned modulated object coherent wave is again reflected in the forward direction (reflects off the scanned object(s)) towards the base, which is parallel to a recording medium/means (usually a film plate) while simultaneously, the second portion (L2) or lower section or portion of the "bent pyramid/bent teepee" cone apparatus, i.e. level 2, has its own separate series of angles which are constant i.e. $\theta_2$, wherein $\theta_2$ can for example equal 22.5°, hence an incoming coaxial wave or beam, i.e. laser coherent light (spread) is divided and (in some applications halved, i.e., any desired ratio of object beam to reference beam hence, 4 to 1, etc.) further will impinge upon the first surface mirrored sections and be reflected at $2\theta=45°$ and will illuminate the base area and recording medium with a pure reference wave or beam and interact (entangled, mix) with the scanned (reflected) modulated object wave from above, thereby, creating a nearly perfect replica or hologram of the physical object, since the separation angle is, much greater than zero. The result is an in-line, on-axis transmission hologram.

This new process method and system could not have been accomplished using the prior art and the inherent limitations of the apparatus as described in U.S. Pat. No. 5,369,511. The use of first surface silver mirrors and gold as well as specialty reflective optical coatings and multi-layer optics and multi-layer super mirrors, see Applied Optics Vol. 34, No. 34, Dec. 1, 1995, incorporated herein by reference, enhances the instant invention. Additional methods and means known to those skilled in the art can be employed. All of the above and aforementioned will enable the lens apparatus to be more robust and versatile. The instant invention can also be used to create a true holodeck with complete realistic artificial environments. In addition, cylindrical mirrors and/or cylindrical lenses can be substituted and assembled as the slanted mirrors or dihedral steps. This will also create dynamic/panoramic holograms; see Applied Optics, Vol. 17, No. 20, Leith, Chen, Roth Oct. 15, 1978, incorporated by reference herein. Also, see SPIE Vol. 812, Progress in Holography 1987, C. G. Stojanoff, W. Windein incorporated by reference herein. The instant invention can also have flat sides in contrast to the normal slanted dihedral mirrors, these flat side can be holographic optical elements and other diffractive optics and refractive optics including flat cylindrical steps or sides.

Specialty mirrors and optical coatings known to those skilled in the art can increase the angle of reflection, principally for x-rays, gamma rays, neutrons and other higher energy particles. This can increase the versatility of the instant invention. This new embodiment and instant invention will now enable the practical creation of transmission holograms of physical objects using the visible spectrum and invisible spectrum including the creation of X-ray type holograms.

Also, one interesting observation and/or method/technique is to consider the junction of level 1 and level 2. If a recording medium were to be placed in the interior of the device (parallel to the base) near this junction and an object is placed as previously mentioned (on one side of medium or holographic plate/means), then all that is required is to change the constant angles of the dihedral (slanted mirrors) of level 2 so that they instead (also reverse) and illuminate the recording medium or plate from the opposite side or 180° of separation. Therefore, a dynamic and panoramic reflection hologram is created, which also can be viewed effectively over a hemisphere. In addition, at the apex, or capstone, which can be truncated or opened, various imaging lenses and or condensing lenses can be positioned/placed. At the base lenses can also be placed if desired. Optical stops and methods known in the art can be used to block off any unwanted or stray light to achieve the objective.

The instant invention has numerous applications an additional use is in the area of solar energy. The device itself can employ specialty mirrors and means known to those skilled in the art to track the sun and stars (and moon) by its sheer geometry heliostats are not required. The use of non-imaging optical principles will enable the device to multiply and amplify sunlight since cylindrical optical elements and other means can create real images of multiple suns via the plethora of steps. Therefore, massive amounts of solar and starlight can be harnessed to create electrical energy and to create hydrogen etc. The instant invention is a unique new type of lens technology and can form real images so that its imaging property can be directed towards the stars to possibly augment and/or replace the aging Hubble telescope.

Holographic Traffic Control Barriers

The holographic traffic lights are revolutionary and will aid and enhance modern and future traffic safety. A further improvement to the art and instant invention is to holographically project onto a vehicles windshield or drivers field of vision/view an instantaneous real-time 2-D or 3-D image projection of say traffic barriers which restrict and guide drivers to designated areas or cause them to stop or proceed and generally provide direction information continuously in actual real-time. Such barriers can be made to disappear and/or fade to infinity thereby eliminating costly delays and in effect a central control station or controller could theoretically using optimization programs mathematical models and associated algorithms minimize traffic congestion by discretely controlling, staggering and limiting certain groups of vehicles or contiguous vehicles at critical times of day acting as a type of super holographic High Occupancy Vehicle (HOV) discriminator and controller. The objective and purpose would be to maintain a constant throughput by virtually controlling in real-time virtually all incoming and outgoing vehicles in a region at any time of day or instantly to maintain a continuity and minimize and eliminate congestion and tie-ups. The use of the instant invention including computer 3-D digital projection means and Quantum Dot/programmable matter technology will effectively allow the creation of realistic traffic control images to enhance safety and eliminate the modern drudgery of chronic traffic tie-ups and congestion. The device can also augment and improve LED/LCD low power and/or cost systems.

Virtually any type traffic control means could be projected into the field of vision or on the windshield of vehicles of drivers including law enforcement figures and icons as well as crucial messages. The above will serve to free mankind from the systemic problems and bottlenecks primarily due to the limitations of current traffic control science and technology.

BRIEF DESCRIPTION OF DRAWINGS

FIG. 20 depicts a mathematical description of the bent pyramid as it relates to the Laplace Transform.

DETAILED DESCRIPTION

Figure 1:
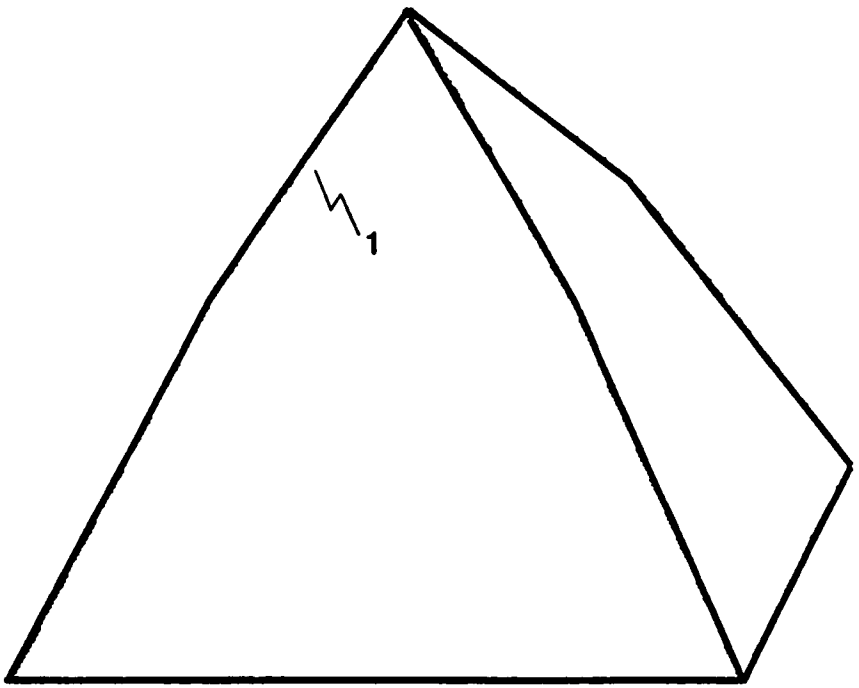
FIG. 1 illustrates of an outline of a bent pyramidal lens showing Level 1 and Level 2.

FIG. 1 is an illustration of the instant invention in the form of a bent pyramidal lens [1]. The structure can also be considered to be an optical base, which can have optical properties or simply be optically clear.

Figure 2:
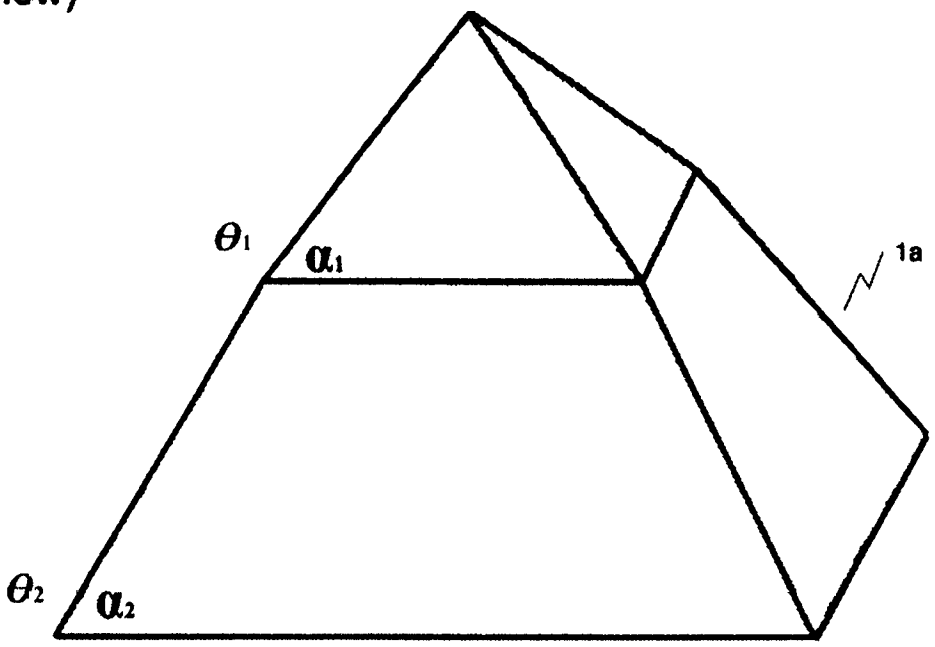
FIG. 2 shows a solid view of a bent pyramidal lens with $\alpha$ and $\theta$ angles.

FIG. 2 is an illustration of a bent pyramidal lens [1a] or base that shows the interior angles $\alpha_1$ & $\alpha_2$ and the exterior angles $\theta_1$ and $\theta_2$ of level 1 and level 2 respectively, which are the desired angles of the dihedral mirror steps.

Figure 3:
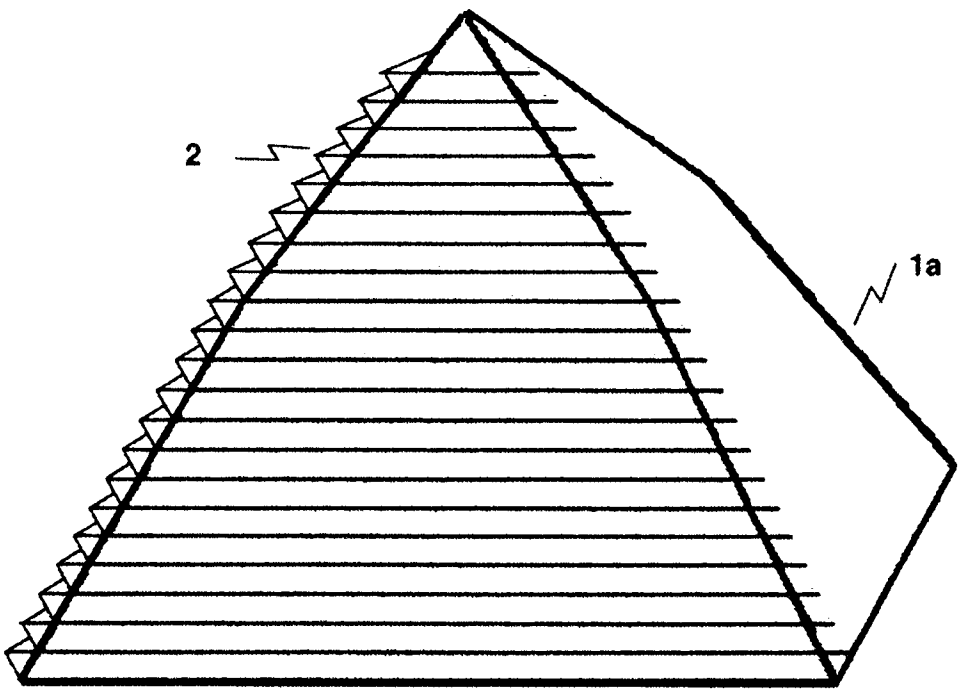
FIG. 3 portrays a partial stepwise view of a bent pyramidal lens.

FIG. 3 is an illustration of a bent pyramidal lens [1a] and what is shown is a partial stepwise view [2] of the slanted dihedral mirrors.

Figure 4:
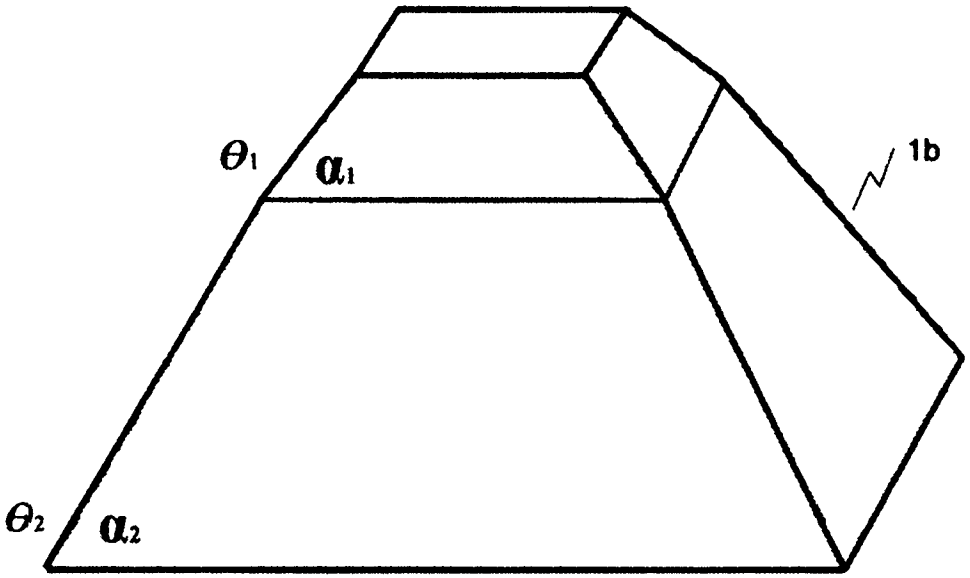
FIG. 4 depicts of a truncated bent pyramidal lens outline.

FIG. 4 is an illustration of the bent pyramidal lens that that has been opened and truncated.

Figure 5:
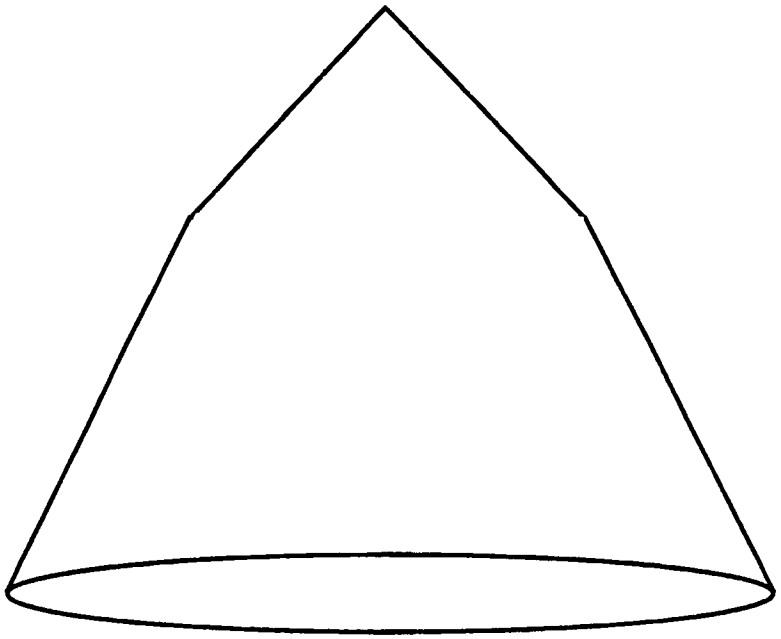
FIG. 5 renders the outline of a bent conical or teepee lens.

FIG. 5 is an illustration of a bent conical/teepee lens. The apparatus can also be used as the optical base and can have optical properties to augment the device or can be simply optically clear.

Figure 6:
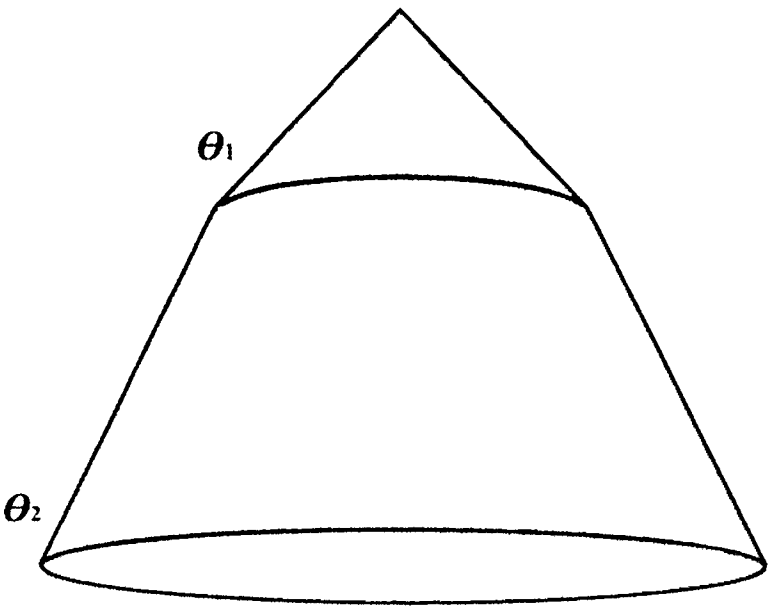
FIG. 6 is an illustration of solid view of a bent conical lens with $\alpha$ and $\theta$ angles.

FIG. 6 is an illustration of the bent teepee/conical lens having angles $\alpha$1 for level 1 and $\alpha$2 for level 2 respectively, wherein the angles of the contiguous series of dihedral or slanted mirrors would be equal to $\theta_1$ and the level 2 lower portion series of discrete mirrors wherein each mirror angle would be equal to $\theta_2$. Also is shown the interior or compound angles for the top level 1 and level 2 lower portions $\alpha_1$ & $\alpha_2$ respectively.

Figure 7:
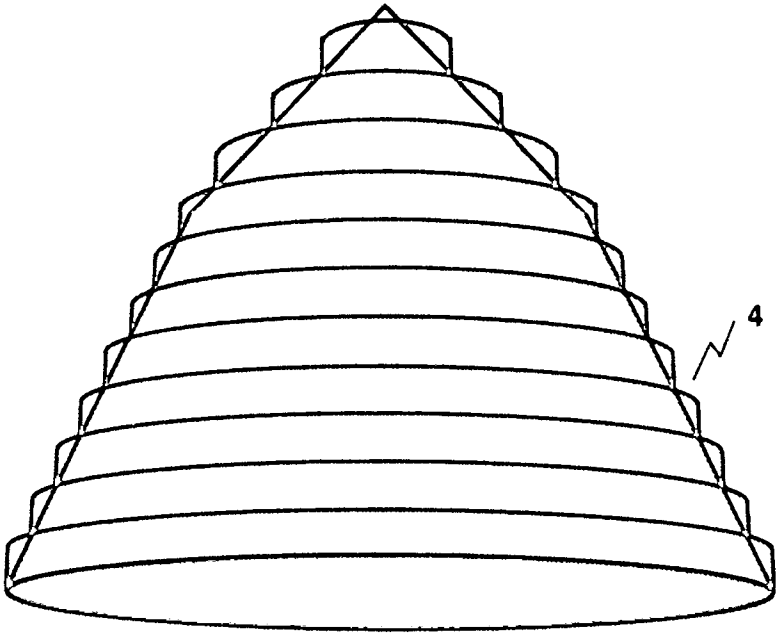
FIG. 7 is a picture of a stepwise view of a bent conical/teepee lens apparatus.

FIG. 7 is an illustration of a bent conical/teepee lens with an assembly of slanted or dihedral mirrors [4].

Figure 8:
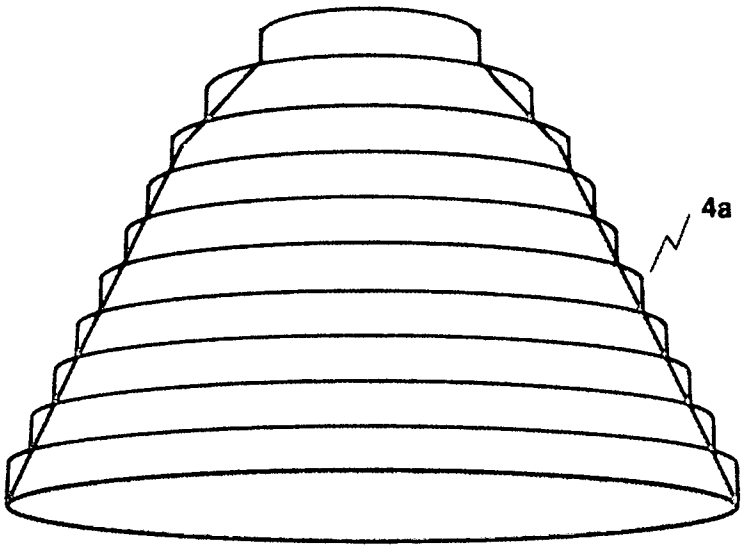
FIG. 8 is a depiction of a stepwise-truncated view of a bent conical/teepee lens apparatus.

FIG. 8 is an illustration of the bent conical/teepee lens that depicts a stepwise truncation [4a] and a stacked series of lenses or slanted dihedral mirrors.

Figure 9:
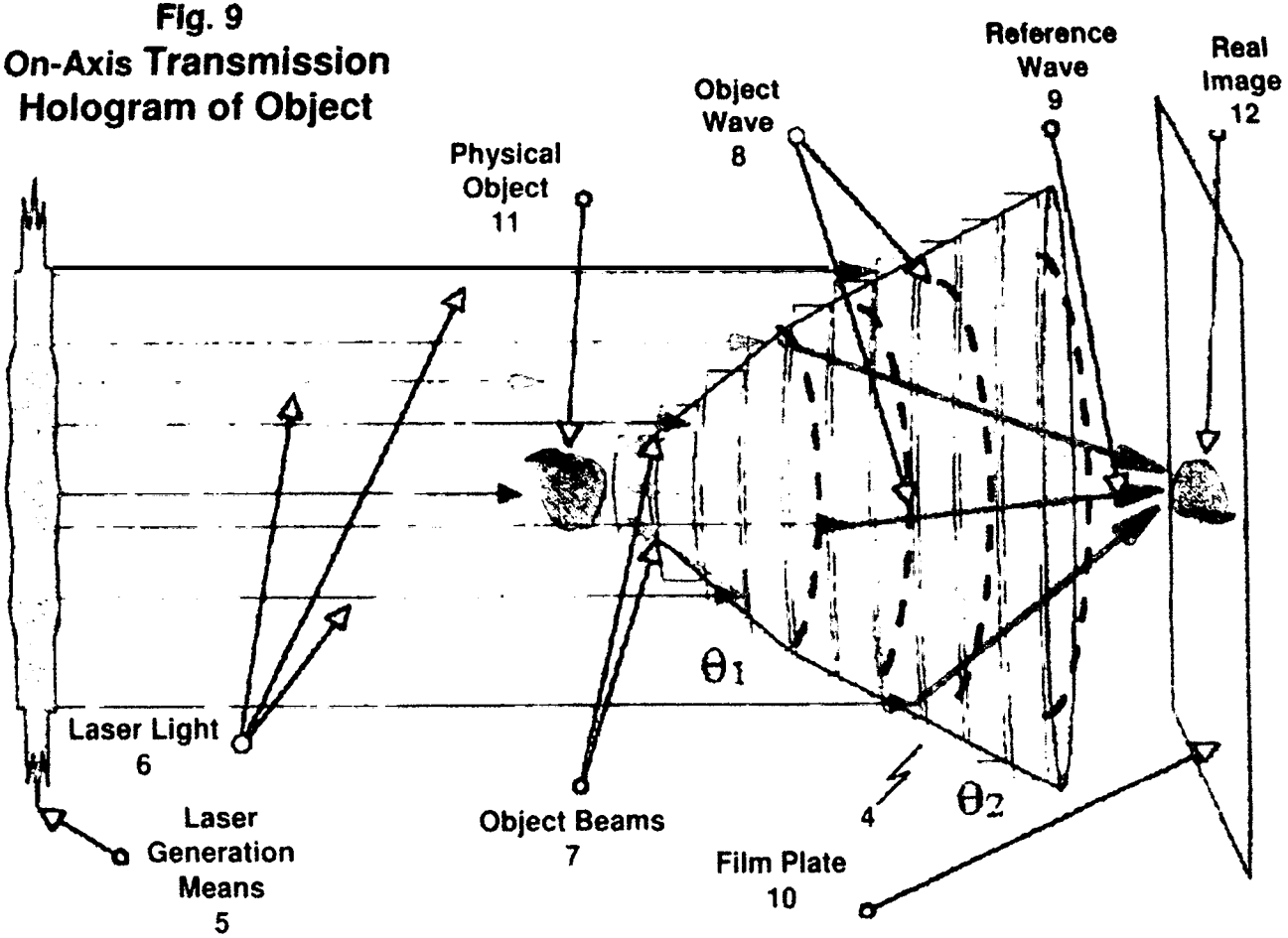
FIG. 9 is a portrayal of a physical object, i.e. an apple, being made into a hologram.

FIG. 9 is an illustration of the instant invention with laser generation means [5] and laser light [6]. A physical object [11], i.e. apple, can be positioned at the mouth or opening of the apparatus or can be placed in the interior of the instant invention [4]. The laser light [6] reflects off the slanted dihedral mirrors, which have constant angles $\theta_1$ at level 1 and are shown as the object beams [7]. These object beams [7] are again reflected off the apple or physical object [11] and this reflected modulated light becomes the object wave [8]. The laser light [6] continues and reaches level 2 and reflects off of the series of angled, $\theta_2$, dihedral mirrors and this pure beam now becomes the reference wave [9]. Therefore both object wave [8] and reference wave [9] will mix and illuminate film plate [10], thereby creating a hologram [12]. This hologram can have a real image or virtual image and can be inverted or made upright as desired. This type of hologram [12] is called a transmission hologram.

Figure 10:
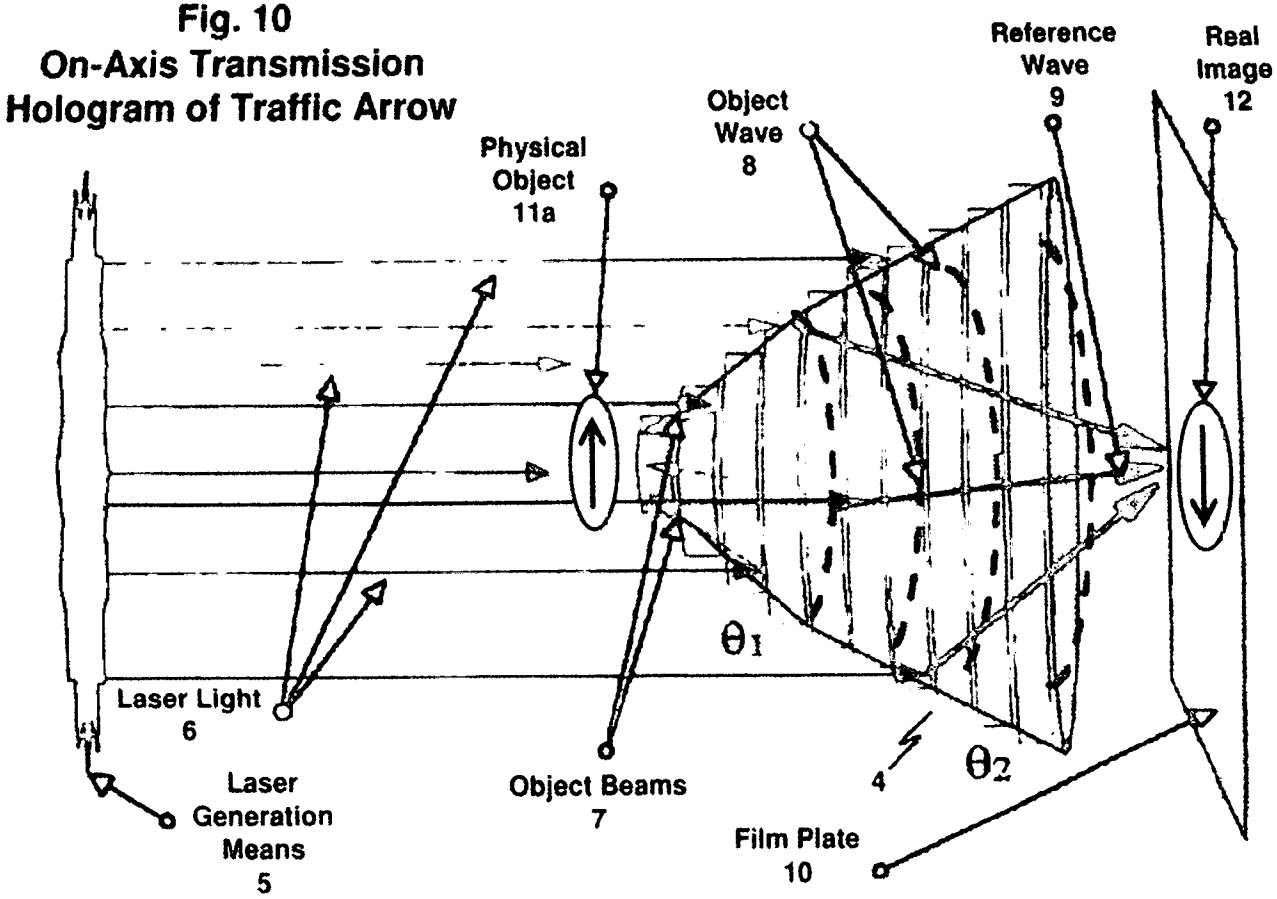
FIG. 10 is a rendering of a physical object being made into a hologram.

FIG. 10 is an illustration of an on-axis transmission hologram of a physical traffic lens arrow [11a]. Laser generation means [5] causes laser light [6] to impinge upon the instant invention [4]. At level 1 or the topmost section object beams [7] are created from the reflection off of the angled $\theta_1$ mirrors. These object beams will illuminate and scan the physical object [11a] and then are reflected in the forward direction upon modulation and now become object wave [8]. The laser light [6] continues and strikes the lower section of angled mirrors $\theta_2$ and this pure beam of laser light now becomes the reference wave [9]. Therefore, both object wave [8] and reference wave [9] will mix and impinge upon the film plate [10] creating a hologram, which can be a real image or virtual image and be made inverted or upright as needed.

Figure 11:
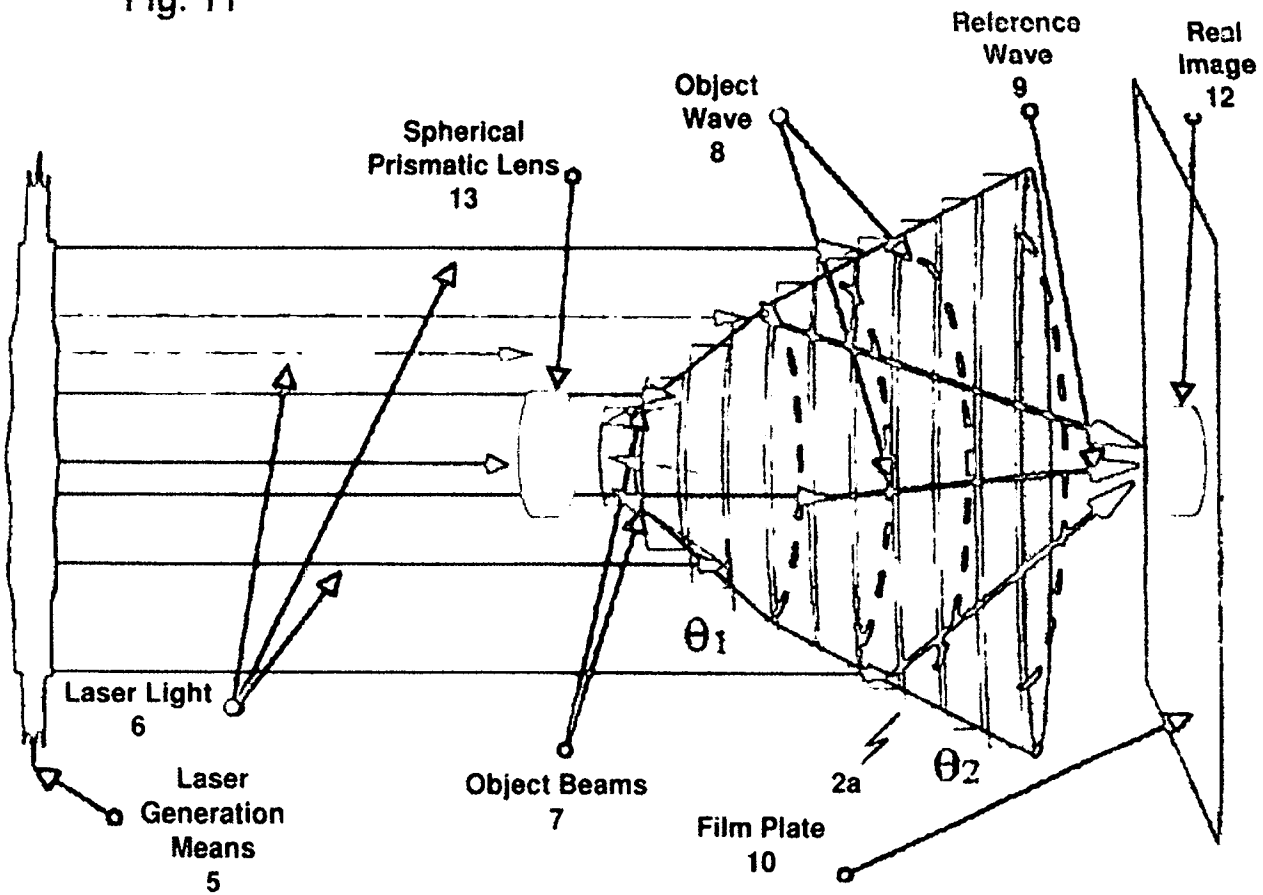
FIG. 11 illustrates a physical object, i.e. a traffic light lens, being made in to a hologram.
Figure 12:
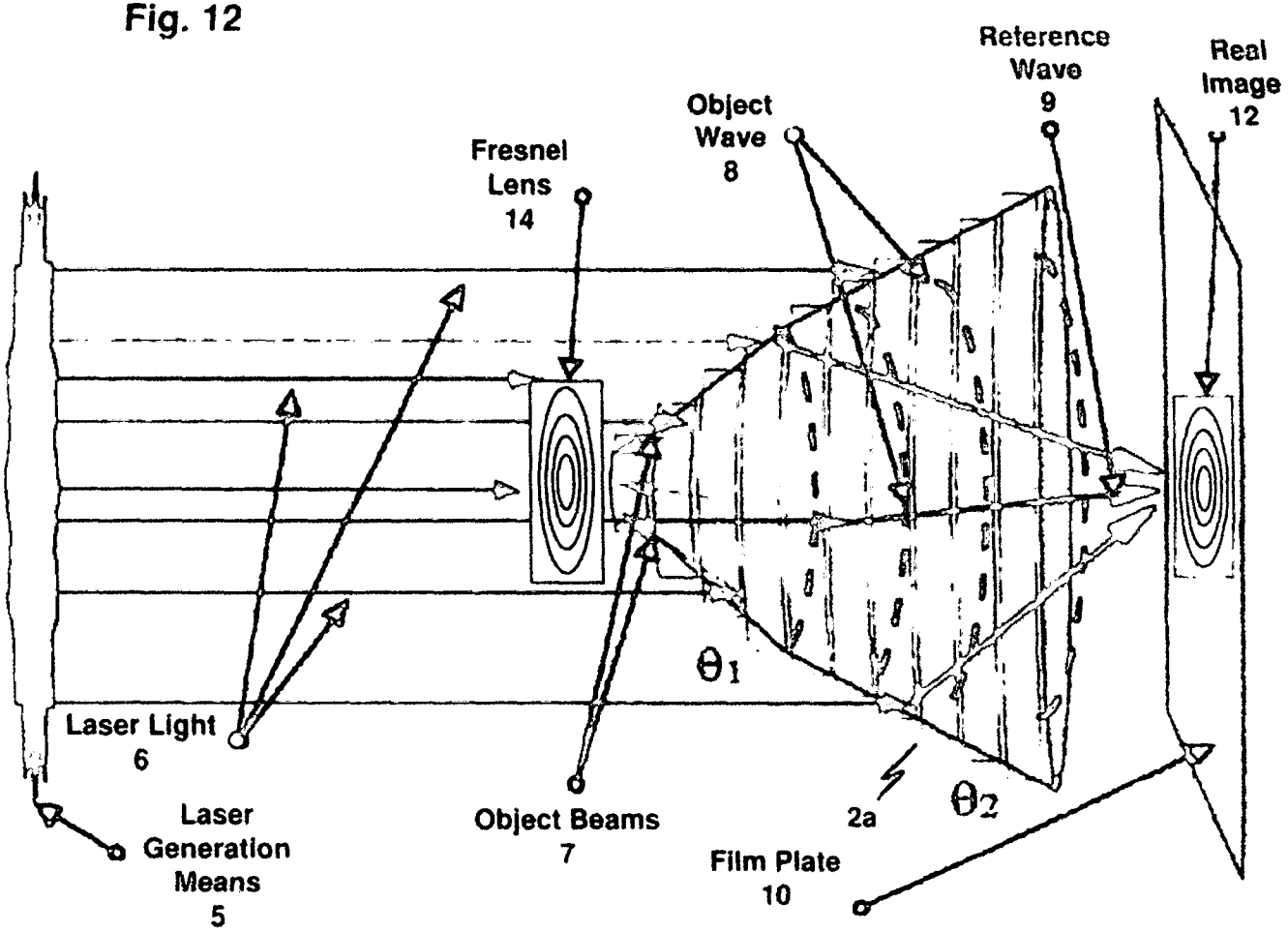
FIG. 12 shows a fresnel lens being converted into an on-axis transmission hologram FIG. 13 portrays of a advertisement made into a hologram.

FIGS. 11 and 12 are illustrations of a physical spherical prismatic lens [13] traffic light lens and a physical fresnel traffic light lens [14] respectively. The instant invention [2a] is employed and the aforementioned hologram [12] is created of a real image (or virtual) of a spherical prismatic traffic light lens or of a fresnel traffic light lens. Notice that in FIGS. 9, 11 & 12, the hologram is in-line and on-axis.

Figure 13:
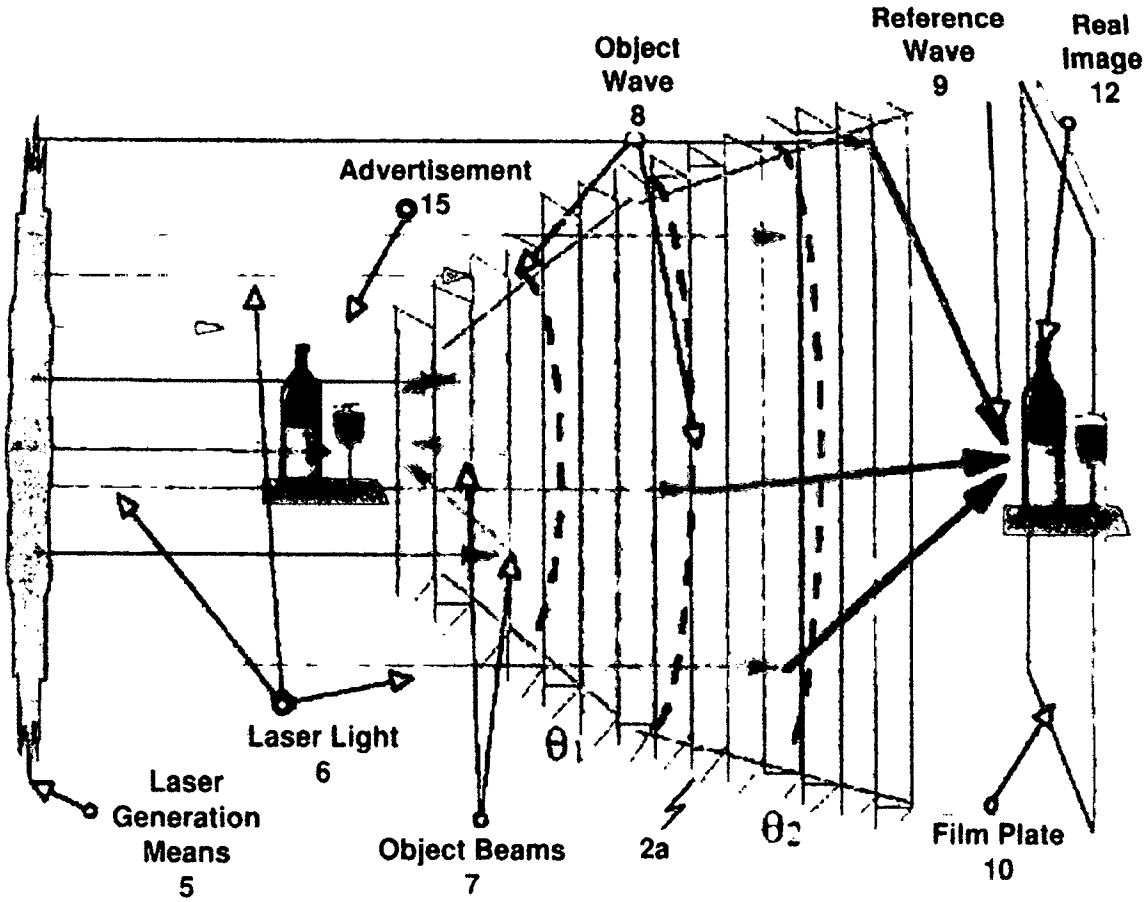

FIG. 13 is an illustration of the instant invention [2a] and a physical advertisement [15], which also can be computer generated or digitally made. In accordance with the aforementioned process and method a hologram [12] is created at the film plate [10].

Figure 14:
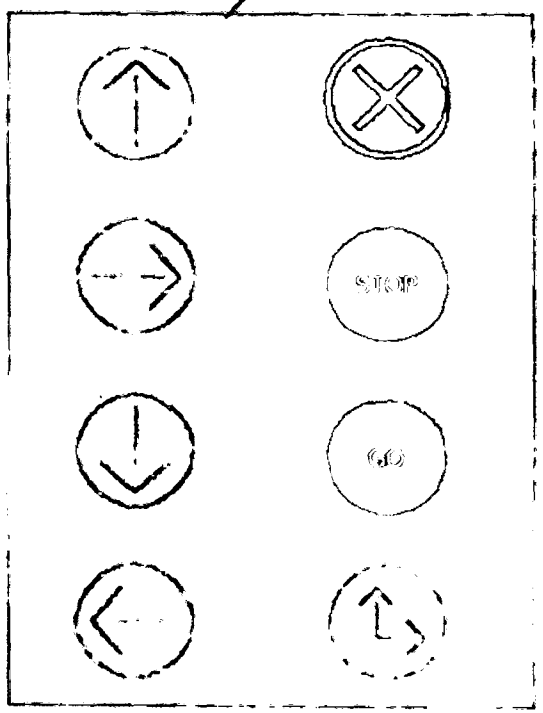
FIG. 14 depicts of sample holographic traffic signal images.
Figure 14:
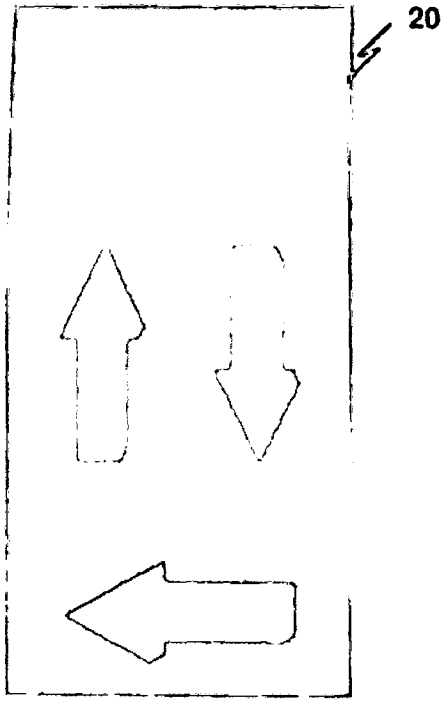

FIG. 14 is an illustration of sample holographic traffic signal images. The arrow images [20] and diverse directional and command images [21] are shown. These images can be used to holographically control traffic.

Figures 15A, 15B:
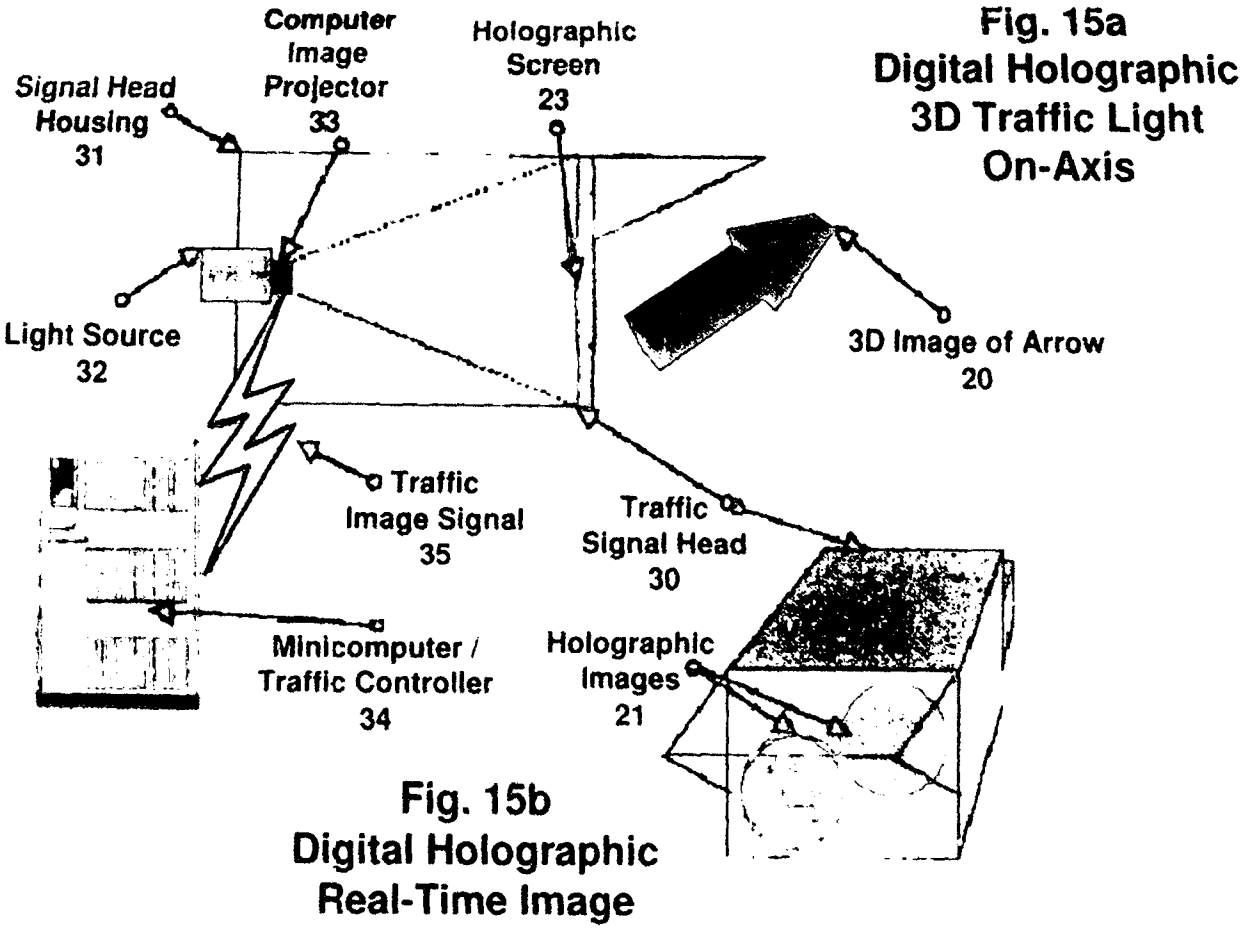
FIG. 15a renders of an on-axis Digital Holographic 3D Traffic Light.
FIG. 15b is an illustration of a Digital Holographic Real-time Images

FIG. 15a is an illustration of a digital holographic 3D traffic light, which operates on-axis. The drawing shows signal housing [31], a light source [32], a computer image projector [33], a holographic screen [23] that can be a holographic optical element if desired, a minicomputer/traffic controller [34], traffic image information and signals [35], and the device itself, which can be considered as a traffic signal head [30]. True 3D images of information and arrow [20] is projected within the space of the device for drivers to see.

FIG. 15b is an illustration of a digital holographic traffic light, which projects images and information as the need requires in real-time, i.e. traffic signal head [30] and holographic images [21].

Figure 16:
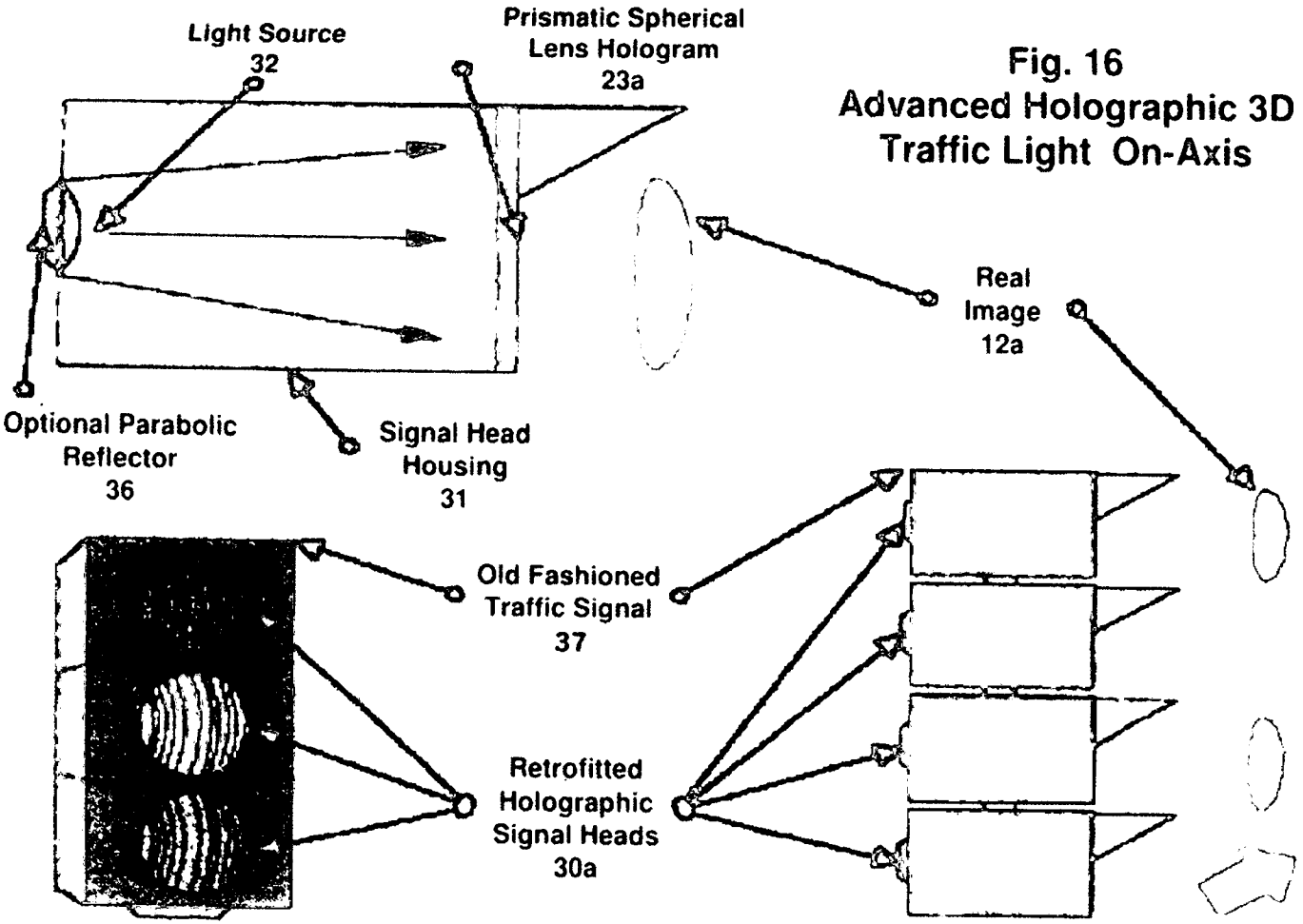
FIG. 16 is a picture of an advanced conventional traffic light.

FIG. 16 is an illustration of an advanced holographic 3D Traffic Light, which operates truly on-axis. The drawing shows light source [32] with optional parabolic reflector [36]. A hologram of a prismatic spherical lens [23a], which are projected as real images [12a] and signal head housing [31]. The on-axis holograms can be designed using the teachings of the instant invention and actually be retrofitted [30a] into old-fashioned traffic signal [37], heads and devices.

Figure 17:
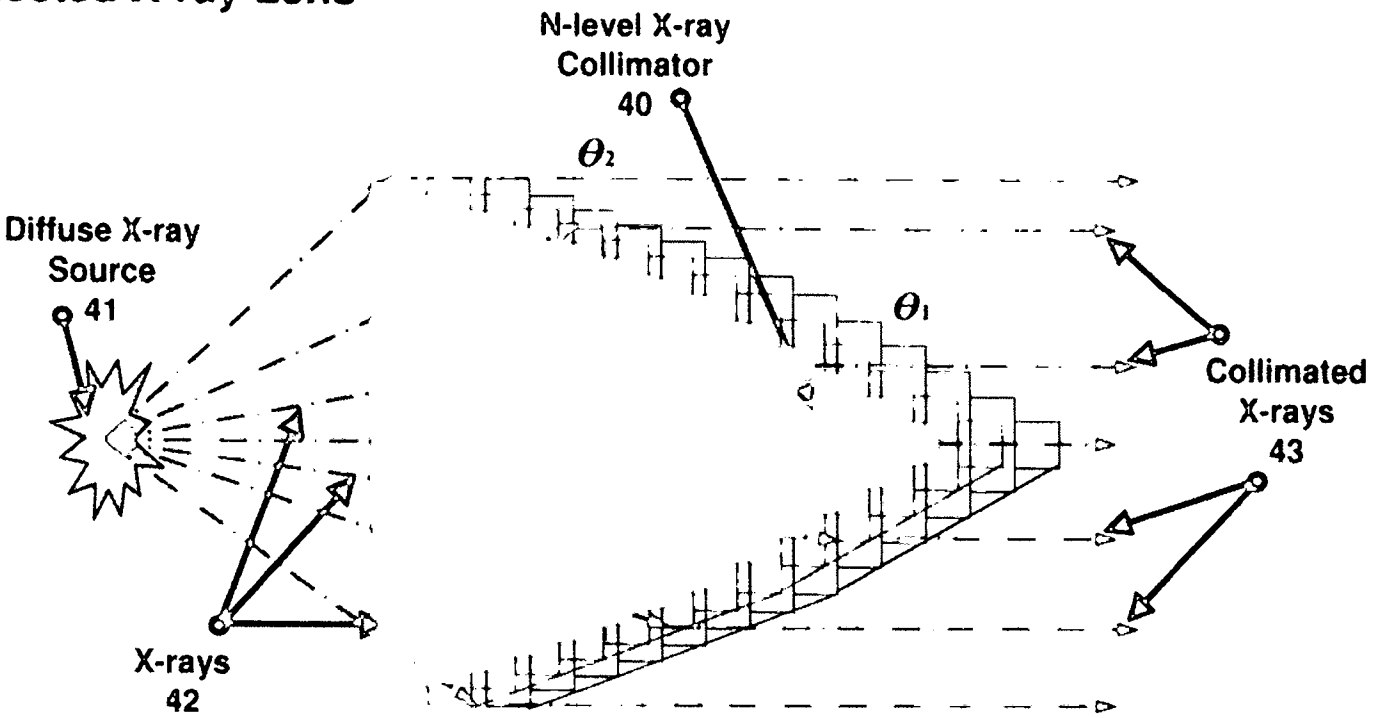
FIG. 17 is a depiction of an aligned array of cascaded bent pyramidal or conical X-ray lenses.

FIG. 17 is an illustration of an X-ray lens array. A diffuse source of x-rays [41] is shown and x-rays [42] impinge upon the N-level X-ray collimator/Lens [40] (N can be any number of lenses as required), collimated X-ray [43] are produced. The instant invention is an alignment and cascaded arrangement of stacked bent pyramidal and/or bent conical teepee lenses. The lens arrays as depicted in the illustration are actually stacked and/or cascaded structures, wherein several bent pyramidal and/or bent teepee/conical lenses are fitted and placed on top of each other in a series arrangement or alignment as shown. The device is capable of accepting a diffuse source of X-rays and channeling or directing them into a parallel or collimated stream. The reverse will allow the focusing of X-rays. The instant invention is useful in the field of x-ray lithography, see J. Vac. Sci Technol. B, Vol. 6, No. 1, January/February 1988, incorporated by reference herein, also, see "Design of Grazing-Incidence Multilayer Supermirrors for hard-x-ray reflectors", Joensen, Voutov, Szentgyorgyi, Roll, Gorenstein, Hoghoj and Finn E. Christensen, Applied Optics Vol. 34, No 34, Dec. 1, 1995, incorporated by reference herein.

The angles can be chosen as desired, they can be constant or variable and generally have any angular arrangement or mix. The application of multi-layer optical materials extends the angular range for grazing incidence first surface super mirrors. This will in turn enhance the instant invention and cause progress in the art, enabling the creation of super dense computer chips as well as applications in the medical field and other industries.

Figure 18:
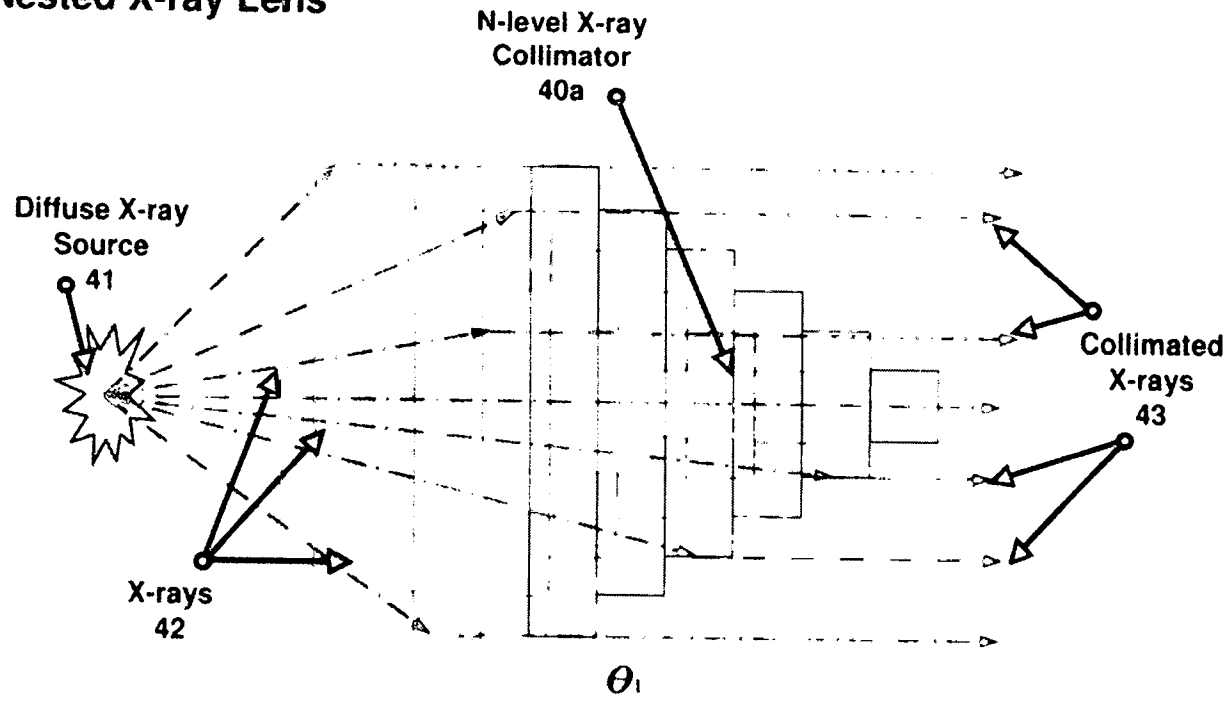
FIG. 18 is a portrayal of an aligned array of cascaded pyramidal or conical X-ray lenses.

FIG. 18 is an illustration of a pyramidal and or conical nested X-ray lens the drawing shows a diffuse x-ray source [41] and x-rays [42] impinging upon the N-level X-ray collimator [40a] (N can be any number as desired) the result are the creation of collimated x-rays. The array of stacked and cascaded alignment of conical or pyramidal lenses is a further improvement over prior art as depicted in U.S. Pat. No. 5,369,511, wherein the efficiency of the structure depicted is limited and prone to leakage of X-rays. The cascaded or stacked alignment array is a significant improvement and provides a more robust, useful, and practical X-ray lens.

Figure 19A:
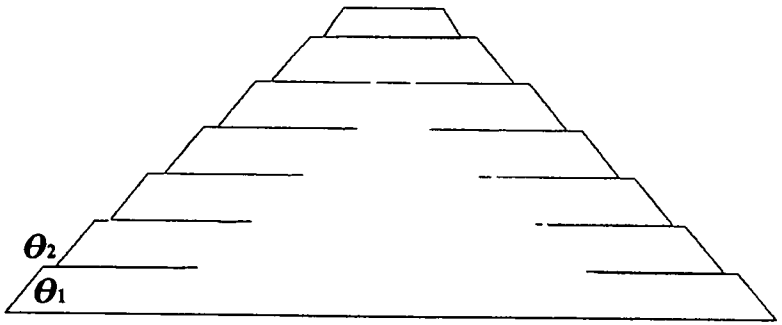
FIG. 19a is a rendering of multiple step pyramidal lens with $\theta_1$ and $\theta_2$ alternating angles

FIG. 19a is a variant of the art and is a multiple step pyramid with alternating angles $\theta_1$ and $\theta_2$ and this device can have refractive lenses for the steps or holographic/diffractive angled steps.

Figure 19B:
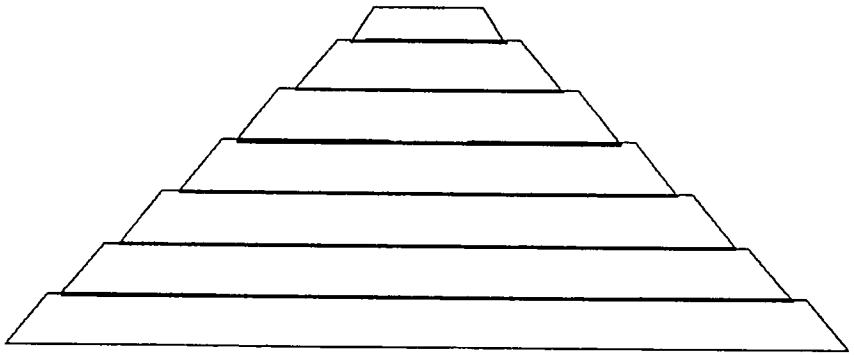
FIG. 19b illustrates a multiple step pyramidal lens that can utilize acousto-optical elements.

FIG. 19b is a further variation of the art wherein the steps can be cylindrical lenses arranged in an Aztec or inverted style and in some applications acousto-optical elements may be employed and used as the angular steps, FIG. 20 is a mathematical explanation of the Laplace Transform and its relationship to a bent pyramid, wherein FIG. 20C illustrates in a special case they can be considered equivalent and possibly the Laplace Transform harmonic equation may have its origin from the bent pyramid.

Incorporated by reference herein is Partial Differential Equations for Scientist and Engineers by Stanley J. Farlow, Dover, 1993.

Description of the Bent Pyramid Base and Bent Cone Base:

Laplacian Equation = $^2u = 0$;

$$\text{LAPf} == {}^2f = \frac{\partial^2 f}{\partial x^2} + \frac{\partial^2 f}{\partial y^2} + \frac{\partial^2 f}{\partial z^2} = 0 = \text{Harmonic}$$

Cartesian Coordinates:

$= {}^2u = u_{xx} + u_{yy}$ |2-dimensional|

$= {}^2u = u_{xx} + u_{yy} + u_{zz}$ |3-dimensional|

Spherical Coordinates(r, v, h):

$r^2 = x^2 + y^2 + z^2$

Cosh = z/r

Tanh = z/r hence, x = rSinvCosh y = rSinvSinh z = rCosv

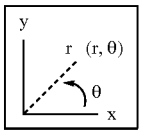

Consider 2-D Laplacian and its functional dependence

Polar coordinates, $r^2 = x^2 + y^2$ x = r Cosh $h = \text{Tan}^{-1}(y/x)$ y = r Sinh

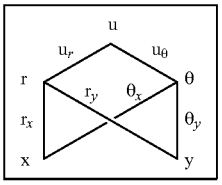

ux = urrx + $u_h$ hx

= ur Cosh - $u_h$ Sinh/r

Using chain rule:

uy = ur ry + $u_h$ hy

= ur(Sinh) + $u_h$ (Cosh/r)

2nd Order Derivative

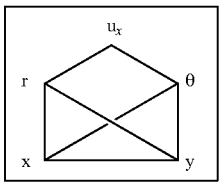

Functional depenence of ux or (r, h) and (x, y)

$$u_{xx} = (u_x)_x - (u_x)_r \cdot r_x + (u_x)_h$$

$$h_x = (u_r\mathrm{Cosh} - u_h\mathrm{Sinh}/r)(r\mathrm{Sinh}) + (u_r\mathrm{Cosh} - u_h\mathrm{Sinh}/r)(\mathrm{Sinh}/r)$$
$$= (u_{rr}\mathrm{Cosh} - u_{rh}\mathrm{Sinh}/r + u_h\mathrm{Sinh}/r^2)\mathrm{Cosh} +$$
$$(u_{rh}\mathrm{Cosh} - u_r\mathrm{Sinh} - u_{hh}\mathrm{Sinh}/r - u_h\mathrm{Cosh}/r)(-\mathrm{Sinh}/r)$$

and $$u_{yy} = (u_{rr}\mathrm{Sinh} + u_{rh}\mathrm{Sinh}/r - \mathrm{Cosh}/r^2)(\mathrm{Sinh}) +$$
$$(u_{rh}\mathrm{Sinh} + u_r\mathrm{Cosh} + u_{hh}\mathrm{Cosh}/r - u\mathrm{Sinh}/r)(\mathrm{Cosh}/r)$$

adding $$u_{xx} + u_{yy} \Rightarrow = {}^2u = u_{rr} + 1/r \cdot u_r + 1/r^2 \cdot u_{hh}$$

Similar Analyses for 3-*D* Laplacian: $=^2 = u_{xx} + u_{yy} + u_{zz}$

Cylindrical Coordinates: $:= {}^2u = u_{rr} + 1/r \cdot u_{rr} + 1/r^2 \cdot u_{hh} + u_{zz}$ Spherical Coordinates:

$$= {}^2u = u_{rr} + 2/r \cdot u_r + 1/r^2 \cdot u_{hh} + \frac{\mathrm{Coth}}{r^2}u_h + \frac{1}{r^2\mathrm{Sin}^2 v}u_{hh}$$

Bent Pyramid/Bent Tepee-Conical Lens Base is a special case and is a modified Advanced Laplacian Harmonic. We can consider for example, Equivalence: $=^2u_a = =^2u_b$ in Cartesian Coordinates (A) $=^2u_a = u_{xx} + u_{yy} + u_{zz}$ (B) $=^2u_b = u_{xx} + u_{yy} + u_{zz}$

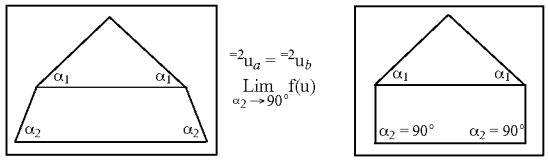

Figure 21:
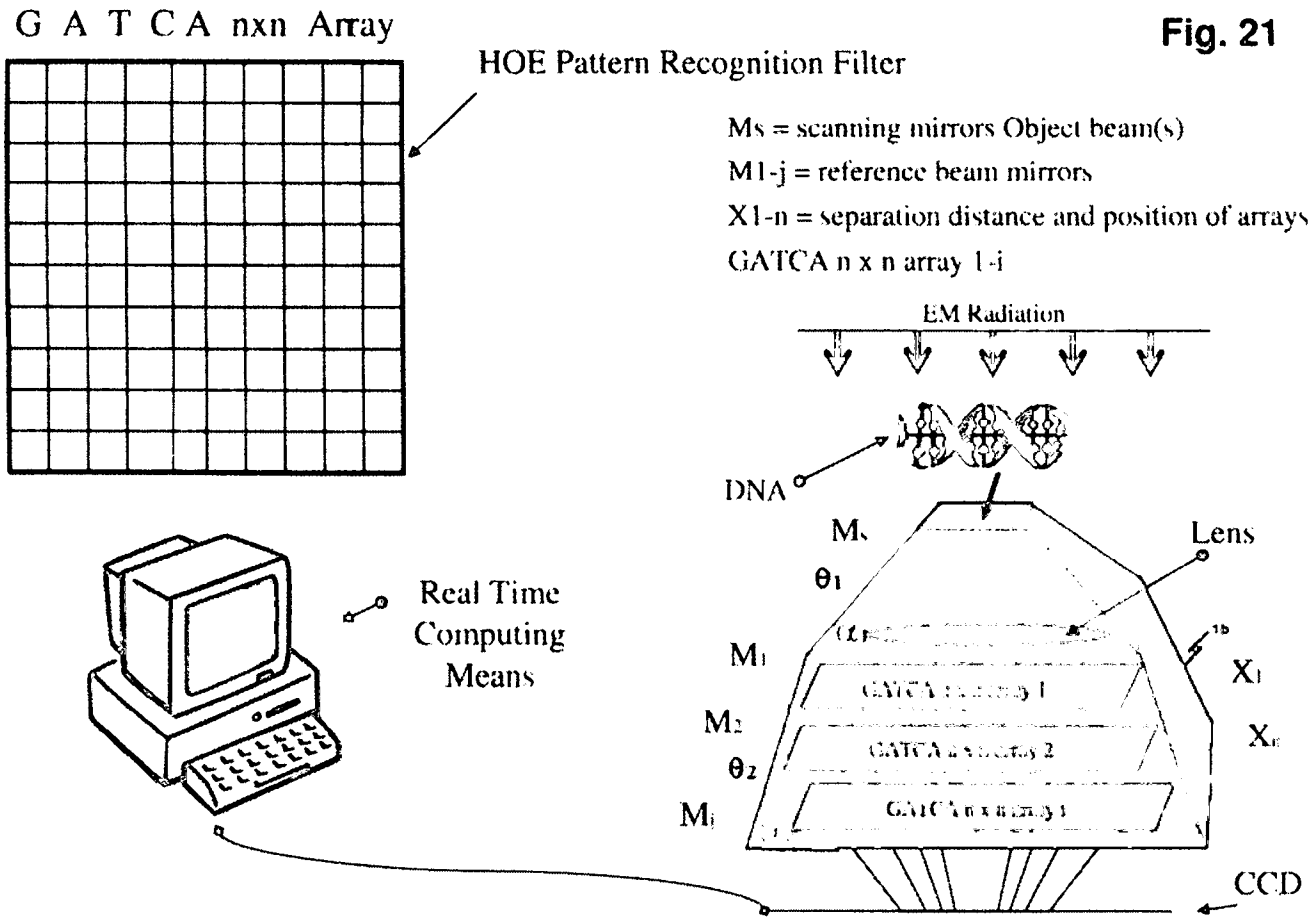
FIG. 21 is an illustration of the bent pyramidal conical lens with applications to identification of DNA/RNA and the Human Genome.

$\alpha_1 \neq \alpha_2$
$0 < \alpha_1 < 90°$
$0 < \alpha_2 < 90°$ $0 < \alpha_1 < 90°$
$\alpha_2 = 90°$
$\mathrm{Cos}\ 90° = 0,\ \mathrm{Sin}\ 90° = 1$ FIG. 21 is an illustration of the Instant Invention as it applies to DNA and the Human Genome, utilizing holographic pattern recognition and associated technology, known to those skilled in the art, to identify and decode DNA/RNA. The HOE Pattern Recognition Filter(s) consist of n elements, where n can be any number from 1 to trillions. $M_s$ are scanning mirrors for object beam(s). $M_{1-j}$ are reference beam mirrors. $X_{1-n}$ are separation distances and position of arrays. GATCA is a n×n array 1−i. Scanning mirror means and reference beam mirror means can be reflective and/or refractive elements. Incorporated by reference herein are:

Nanotechnology and the Double Helix, by Natrian C. Seeman, Scientific American Reports, Vol 17, Number 3, 2007, pp 30-39.

Brining DNA Computers to Life, by Ehud Shapiro and Yaakov Beneson, Scientific American Reports, Vol 17, Number 3, 2007, pp 40-47.

FROM HELIX TO HOLOGRAM: An Ode on the Human Genome by Iona Miller and Richard Alan Miller© 2003, OAK Publishing, Inc. Oregon, USA;

Real-time Analog Holography and Pattern Recognition by Amy S. Kransteuber at the Advanced Optical Systems, Inc., Huntsville, Ala. 35805, and Don A. Gregory at the Department of Physics, University of Alabama in Huntsville, Huntsville, Ala. 35899, 19 Jan. 2001;

Special Report: Optical Patterns© 1998-2005.

What is claimed is:

1. A system for a creation of holograms consisting of a laser generating means, a recording means, and an apparatus for manipulating electromagnetic (EM) energy; wherein said apparatus consists of an array of co-aligned, angled, adjoining (Co-AAA) reflective surfaces that allow collection, redirection, or focusing of EM energy to provide a reference wave and object beams or object wave simultaneously to produce, from a physical object, or replay a hologram onto said recording means, wherein further said apparatus is arranged in a bent pyramidal or conical form.

2. The system of claim 1 wherein said hologram is an on-axis or in-line transmission hologram.

3. The system of claim 1 wherein the surfaces are highly reflective surfaces.

4. The apparatus of claim 3, wherein the highly reflective surfaces consist of continuous or discreet or otherwise contiguous mirrors.

5. The system of claim 1 wherein the array of Co-AAA reflective surfaces consists of at least two different distinct angles of incidence for co-aligned pyramidal or conical adjoined surfaces along one common axis as zero degrees from any point of view of the bent pyramidal or conical form, a 3 dimensional structure, where the angles chosen are constant or variable in an angular arrangement.

6. The system of claim 1 wherein said Co-AAA reflective surfaces consists of a first set of scanning mirrors that creates said object wave or object beams, and a second set of scanning mirrors that creates said reference wave.

7. The system of claim 1 wherein said reference wave is an unmodulated or clean wave.

8. The system of claim 1 wherein the apparatus is used to harness, focus, or collimate EM energy or radiation, including:

i. x-rays, gamma rays, neutrons and other high energy particles, where the aligned angle(s) are optimally in mili-radians or within one degree from a common axis;

ii. visible and near visible spectra, particularly for solar power generation, where the aligned angles includes, by the angular arrangement or geometry ranging from zero to ninety degrees from the common axis, track the sun, stars, and moon in a hemisphere.

9. The system of claim 1 wherein said Co-AAA reflective surfaces consists of a first set of scanning mirrors that creates said object wave or object beams, and a second set of scanning mirrors that creates said reference wave, wherein further said first set of scanning mirrors has a first distinct angle of incidence of at least two different distinct angles of incidence and said second set of scanning mirrors has a second distinct angle of incidence of the at least two different distinct angles of incidence.

*10. The system of claim 1 wherein said hologram is an on-axis or in-line reflection hologram.*

* * * * *